US008303691B2

(12) United States Patent
Itami

(10) Patent No.: US 8,303,691 B2
(45) Date of Patent: Nov. 6, 2012

(54) COMPOSITE MEMBRANES

(75) Inventor: Yujiro Itami, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 267 days.

(21) Appl. No.: 12/936,603

(22) PCT Filed: Apr. 6, 2009

(86) PCT No.: PCT/GB2009/050336
§ 371 (c)(1),
(2), (4) Date: Oct. 6, 2010

(87) PCT Pub. No.: WO2009/125218
PCT Pub. Date: Oct. 15, 2009

(65) Prior Publication Data
US 2011/0030559 A1  Feb. 10, 2011

(30) Foreign Application Priority Data

Apr. 8, 2008  (EP) ..................................... 08007073

(51) Int. Cl.
*B01D 53/22* (2006.01)
(52) U.S. Cl. ................. 96/12; 95/45; 95/51; 96/4; 96/11
(58) Field of Classification Search ................. 95/45, 51; 96/4, 11, 12
See application file for complete search history.

(56) References Cited

U.S. PATENT DOCUMENTS

| | | | |
|---|---|---|---|
| 2,761,791 A | 9/1956 | Russell | 117/34 |
| 3,417,870 A | 12/1968 | Bray | 210/321 |
| 4,746,430 A | 5/1988 | Cooley | 210/321.85 |
| 4,806,189 A | 2/1989 | Kraus et al. | 156/155 |
| 4,840,819 A | 6/1989 | Williams et al. | 427/245 |
| 4,976,897 A | 12/1990 | Callahan et al. | 264/22 |
| 5,059,220 A | 10/1991 | Bleha et al. | 55/158 |
| 5,069,926 A | 12/1991 | Iwata et al. | 427/40 |
| 5,096,584 A | 3/1992 | Reddy et al. | 210/321.74 |
| 5,102,552 A | 4/1992 | Callahan et al. | 210/654 |
| 5,487,774 A * | 1/1996 | Peterson et al. | 95/45 |
| 5,500,167 A | 3/1996 | Degen | 264/41 |
| 5,514,413 A | 5/1996 | Van't Hof et al. | 427/244 |
| 5,556,449 A | 9/1996 | Baker et al. | 95/49 |
| 5,580,650 A | 12/1996 | Forgach et al. | 428/304.4 |
| 6,656,252 B2 * | 12/2003 | Kita et al. | 96/4 |
| 7,491,262 B2 * | 2/2009 | Kang et al. | 96/11 |
| 7,833,313 B2 * | 11/2010 | Yoshinaga et al. | 95/53 |
| 8,177,891 B2 * | 5/2012 | Kase et al. | 96/12 |
| 2002/0038602 A1 | 4/2002 | Nelson et al. | 95/45 |
| 2003/0089228 A1 * | 5/2003 | Kulprathipanja et al. | 95/45 |
| 2003/0180425 A1 | 9/2003 | Sanchez et al. | 426/419 |
| 2006/0138043 A1 | 6/2006 | Kharul et al. | 210/490 |
| 2007/0137477 A1 | 6/2007 | Freeman et al. | 95/45 |
| 2010/0126352 A1 * | 5/2010 | Itami et al. | 96/12 |

FOREIGN PATENT DOCUMENTS

| | | |
|---|---|---|
| GB | 837 095 | 6/1960 |
| GB | 2 174 619 | 11/1986 |
| JP | 08 024602 | 7/1994 |
| JP | 08024602 A * | 1/1996 |
| WO | WO 2005/068056 | 7/2005 |
| WO | WO 2007/018425 | 2/2007 |

OTHER PUBLICATIONS

International Search Report issued in PCT Application No. PCT/GB2009/050336.
Hirayama et al., "Permeation properties to $CO_2$ and $N_2$ of poly(ethylene oxide)-containing and crosslinked polymer films", Journal of Membrane Science, 160:87-99 (1999).
Jons et al., "Porous latex composite membranes: fabrication and properties", Journal of Membrane Science, 155:79-99 (1999).
Ju et al., "Crosslinked poly(ethylene oxide) fouling resistant coating materials for oil/water separation", Journal of Membrane Science, 307:260-267 (2008).
Lin et al., "Materials selection guidelines for membranes that remove $CO_2$ from gas mixtures", Journal of Molecular Structure, 739:57-74 (2005).
Lin et al., "Transport and structural characteristics of crosslinked poly(ethylene oxide) rubbers", Journal of Membrane Science, 276:145-161 (2006).
Ramakrishnan et al., "Latex composite membranes: structure and properties of the discriminating layer", 231:57-70 (2004).

* cited by examiner

*Primary Examiner* — Jason M Greene
*Assistant Examiner* — Anthony Shumate
(74) *Attorney, Agent, or Firm* — Morgan, Lewis & Bockius LLP

(57) ABSTRACT

A composite membrane comprising a discriminating layer and a porous support layer for the discriminating layer, CHARACTERISED IN THAT the discriminating layer comprises at least 60 wt % of oxyethylene groups and the porous support layer has a $CO_2$ gas flux of 5 to $150 \times 10^{-5}$ m$^3$ (STP)/m$^2 \cdot$s$\cdot$kPa at a feed pressure of 2.07 kPa. The membranes are particularly useful for purifying waste gas streams e.g. by removing greenhouse gases.

20 Claims, No Drawings

COMPOSITE MEMBRANES

This application is a 371 tiling based on PCT/GB2009/050336, filed Apr. 6, 2009, which claims priority to European Application No. 08007073.3, filed Apr. 8, 2008, which is hereby incorporated by reference in its entirety.

BACKGROUND OF THE INVENTION

This invention relates to composite membranes and to processes for their preparation and use for separating gases.

Ultrafiltration and microfiltration membranes made by coating certain acrylic latexes on a porous support (e.g. a Supor 200 membrane) are known from the article by Steve Jons et al entitled "Porous latex composite membranes: fabrication and properties", published in the *Journal of Membrane Science*, Volume 155, Issue 1, 31 Mar. 1999, Pages 79-99. These membranes were used for the filtration of cherry juice. The acrylic latexes used by Jons et al did not contain oxyethylene groups.

In the later work of Ramakrishnan et al, further composite microfiltration and ultrafiltration membranes were prepared by applying latexes to porous supports such as Supor 200 (see Journal of Membrane Science, Volume 231, Issues 1-2, 1 Mar. 2004, Pages 57-70).

JP08024602 discloses gas separation composite membranes comprising a hydrophilic polymer and a hollow fibre support. The membranes however do not have a particularly good gas flux in combination with a high selectivity. The results in this publication suggest that increasing the gas flux of the support will reduce the $CO_2$ flux of the composite membrane.

U.S. Pat. No. 5,556,449 discloses membranes based on a polyether polyamide copolymer layer on a polyvinylidene fluoride support. However no high gas fluxes are reported.

There exists a need for membranes which are capable of separating gases quickly and are selective, distinguishing between different gases; especially between $CO_2$ and $N_2$. For economic feasibility gas separation membranes exhibiting a high gas flux are especially preferred. For membranes separating $CO_2$ from $N_2$ a $CO_2$ flux of at least $0.3 \times 10^{-6}$ $m^3/m^2 \cdot s \cdot kPa$, preferably at least $0.4 \times 10^{-6}$ $m^3/m^2 \cdot s \cdot kPa$, most preferably at least $1.0 \times 10^6$ $m^3/m^2 \cdot s \cdot kPa$, is preferred in combination with at least acceptable selectivity values.

BRIEF SUMMARY OF THE INVENTION

According to a first aspect of the present invention there is provided a composite membrane comprising a discriminating layer and a porous support layer for the discriminating layer, CHARACTERISED IN THAT the discriminating layer comprises at least 60 wt % of oxyethylene groups and the porous support layer has a $CO_2$ as flux of 5 to $15 \times 10^{-5}$ $m^3$ (STP)/$m^2 \cdot s \cdot kPa$ at a feed pressure of 2.07 kPa.

DESCRIPTION OF THE INVENTION

The $CO_2$ gas lux of the porous support layer may be determined prior to manufacture of the composite membrane by measuring the rate at which pure $CO_2$ gas flows through the support per unit area at a feed pressure of 2.07 kPa using a standard gas flow meter, e.g. as described in more detail in the Examples below.

References to the $CO_2$ gas flux of 5 to $150 \times 10^{-5}$ $m^3$ (STP)/$m^2 \cdot s \cdot kPa$ at a feed pressure of 2.07 kPa are used here to define the support layer and are not intended to imply that gas is actually fluxing through the support layer in order for the membrane to fall within the claim. Thus the claims cover the composite membranes both when in use and when not in use.

As porous support layer one may use, for example, a commercially available, porous material having a $CO_2$ gas flux of 5 to $150 \times 10^{-5}$ $m^3$ (STP)/$m^2 \cdot s \cdot kPa$ at a feed pressure of 2.07 kPa. Examples of commercially available materials possessing such a $CO_2$ gas flux include: GMT-L-6 and GMT-NC-5 ultrafiltration polyacrylonitrile membranes from GMT Membrantechnik GmbH, Germany; OMEGA ultrafiltration (300 kD) polyethersulfone membrane from Pall; PAN200 ultrafiltration polyacrylonitrile membrane from Sepro; MP005 microfiltration polyethersulfone membrane from Microdyn-Nadir; and UV150T ultrafiltration PVDF membrane from Microdyn-Nadir.

Alternatively one may prepare the porous support layer using techniques generally known in the art for the preparation of microporous materials. The porous support layer may be constructed from any suitable material. Examples of such materials include polysulfones, polyethersulfones, polyimides, polyethermides, polyamides, polyamideimides, polyacrylonitrile, polycarbonate, polyacrylate, cellulose acetate, polypropylene and poly(4-methyl 1-pentene). If desired the porous support layer and the discriminating layer may be formed sequentially.

The pores in the porous support layer preferably have an average size of 0.0005 to 0.5 μm, preferably 0.0010 to 0.2 μm.

The pore size distribution of the porous support may be quite narrow, although this is not essential for satisfactory performance. Also an asymmetric structure may be used as is described in U.S. Pat. No. 5,702,503. The porous support should be as thin as possible, provided it retains sufficient structural strength for its intended end use.

The porous support layer is not limited to sheet form, for example tubular forms such as hollow fibres can be used.

The structure of the porous support layer is not particularly important as long as it has a $CO_2$ gas flux of 5 to $150 \times 10^{-5}$ $m^3$ (STP)/$m^2 \cdot s \cdot kPa$ at a feed pressure of 2.07 kPa.

The discriminating layer possesses pores which have a size providing the desired separation properties. For separating gases and/or vapours the discriminating layer preferably is preferably substantially non-porous or has pores of very small dimensions, typically below 10 nm, more preferably below 5 nm, especially below 2 nm. Preferably the pores at the surface of the support layer which come into contact with the curable composition are not so large that there is a significant degree of penetration of the curable composition into the pores.

Preferably the discriminating layer has a very low permeability to liquids. In one embodiment the composite membrane has a pure water permeability at 20° C. of less than $6 \times 10^{-8}$ $m^3/m^2 \cdot s \cdot kPa$, more preferably less than $3 \times 10^{-8}$ $m^3/m^2 \cdot s \cdot kPa$.

The discriminating layer is preferably as thin as possible to ensure good gas flux rates across the composite membrane while being sufficiently thick for practical use in the end technical field of interest. The dry thickness of the discriminating layer will typically range from 0.02 to 10 μm, preferably from 0.05 to 5 μm, especially from 0.1 to 2 μm, more especially 0.1 to 1 μm because this can result in particularly good flux rates. The thickness refers to that part of the discriminating layer which is discrete from the support. One may measure this thickness by examining a cross-section through the composite membrane using a scanning electron microscope, where the support layer and discriminating are clearly visible as discrete layers.

The overall dry thickness of the composite membrane will typically range from 20 to 500 µm, preferably from 30 to 300 µm.

Preferably the porous support layer has a $CO_2$ gas flux of 5 to 100, more preferably 7 to $70\times10^{-5}$ m³ (STP)/m²·s·kPa, at a feed pressure of 2.07 kPa.

Preferably the discriminating layer comprises at least 70 wt % of oxyethylene groups. The preferred upper limit for the content of oxyethylene groups in the discriminating layer is 95 wt %. The discriminating layer may be adhered to the porous support layer by any suitable means, for example an adhesive may be used to bond the two together or the discriminating layer may bond to the support layer as it is formed thereon during preparation of the composite membrane. If manufactured separately it may be difficult to make a very thin discriminating layer.

Therefore preferably the discriminating layer is formed directly on the porous support.

According to a second aspect of the present invention there is provided a process for preparing a composite membrane comprising applying a curable composition to a porous support layer having a $CO_2$ gas flux of 5 to $150\times10^{-5}$ m³ (STP)/m²·s·kPa (when measured at a feed pressure of 2.07 kPa) and curing the composition, thereby forming a discriminating layer on the porous support layer, wherein the curable composition comprises non-volatile and optionally volatile components and at least 60 wt % of the non-volatile components are oxyethylene groups.

Preferably the pores of the porous support contain (more preferably are full of) an inert liquid when the curable composition is applied to the support. With inert liquid is meant a liquid not reactive towards either the curable composition or to the support. In this way the presence of the inert liquid in the pores of the support prevent the curable composition from permeating deeply into the support and a more controlled and thin discriminating layer results on the surface of the support.

Even when the pores of the support are full of inert liquid there can be some degree of penetration of the curable composition into the pores, e.g. by diffusion of the curable composition into the inert liquid.

A small degree of penetration can be useful because it helps the discriminating layer adhere to the support and reduces the likelihood of the discriminating layer separating from the support in use, e.g. when being used at high pressures or during back-flushing (depending on whether the discriminating layer is on the higher pressure or lower pressure side of the support when in use). A high degree of penetration, however, can on occasions adversely affect the gas flux of the resultant composite layer.

One may influence the extent to which the curable composition penetrates into the support by, for example, the choice of inert liquid (e.g. an inert liquid immiscible with the curable composition will be penetrated less than an inert miscible liquid), the extent to which the pores are filled with inert liquid (e.g. if the pores are not completely filled this will favour a higher degree of penetration), the viscosity of the curable composition (higher viscosity penetrating less), the surface tension of the curable composition (higher surface tension penetrating less) and the length of time between applying the curable composition to the support and curing (shorter times resulting in less penetration).

For good performance of the composite membrane the discriminating layer preferably forms a continuous and substantially defect free layer on the support.

The inert liquid may be any liquid which does not dissolve the porous support or polymerise in the curing step. Typically the inert liquid comprises water, or an organic solvent, or a mixture comprising water and one or more organic solvents.

Preferably the inert liquid is immiscible with the curable composition because this reduces the likelihood of the composition permeating deeply into the pores of the support prior to curing.

The inert liquid may be incorporated into the porous support layer by any means, for example by soaking the porous support layer with the inert liquid. Usually any excess inert liquid is allowed to drain off before a curable composition is applied to the porous support layer.

Preferably the pores of the porous support layer are completely filled or substantially filled (e.g. at least 80% filled, more preferably at least 90% filled) with the inert liquid. In this way a smoother discriminating layer may be formed than would be the case if the pores were not substantially filled with inert liquid and the gas flux is not unduly affected by permeation of the curable composition deeply into the porous support layer.

If desired the inert liquid may be degassed to avoid gas bubbles roughening the discriminating layer. The degassing may be performed before, during or after application of the inert liquid to the porous support layer.

The curable composition (and for that matter the inert liquid) may be applied to the porous support layer by any suitable method, for example by curtain coating, extrusion coating, slot-die coating, air-knife coating, knife-over-roll coating, blade coating, slide coating, nip roll coating, forward roll coating, reverse roll coating, dip coating, kiss coating, rod bar coating, Foulard coating or spray coating. If desired one or more further layers of curable composition(s) may be applied to the porous layer carrying the curable composition, either with or without intermediate curing of the curable composition first applied to the porous layer.

The coating of multiple layers can be done simultaneously or consecutively. For simultaneous coating of multiple layers, whether they be inert liquid and/or one or more curable compositions, curtain coating, slide coating, slot die coating and extrusion coating are preferred.

In order to produce a sufficiently flowable liquid (e.g. inert liquid or curable composition) for use in a high speed coating machine, it is preferred that the viscosity is below 4000 mPa·s when measured at 35° C., more preferably from 1 to 1000 mPa·s when measured at 35° C. Most preferably the viscosity of the curable composition (and inert liquid when used) is from 1 to 500 mPa·s when measured at 35° C. For coating methods such as slide bead coating the preferred viscosity is from 1 to 100 mPa·s when measured at 35° C., whether the coating material is the curable composition or the inert liquid.

With suitable coating techniques coating speeds of over 15 m/min, e.g. more than 20 m/min or even higher, such as 60 m/min, 120 m/min or up to 400 m/min, can be reached. For coating methods such as slide bead coating the preferred viscosity is from 1 to 100 mPa·s when measured at 35° C. for both the curable composition and, when used, the inert liquid.

Before applying the curable composition to the surface of the porous support this support may be subjected to a corona discharge treatment, glow discharge treatment, flame treatment, ultraviolet light irradiation treatment or the like, e.g. for the purpose of improving its wettability and the adhesiveness.

While it is possible to prepare the composite membrane on a batch basis using a stationary porous support layer, to gain full advantage of the invention it is much preferred to prepare the composite membrane on a continuous basis using a moving porous support layer. The porous support layer may be in the form of a roll which is unwound continuously or the porous support layer may rest on a continuously driven belt.

Using such techniques the curable composition (and inert liquid if desired) can be applied to the support on a continuous basis or it can be applied on a large batch basis. If desired the inert liquid may remain in the composite membrane during storage.

Thus in a preferred process the curable composition is applied continuously to the porous support layer by means of a manufacturing unit comprising a curable composition application station, an irradiation source, a composite membrane collecting station and a means for moving a porous support layer from the curable composition application station to the irradiation source and to the composite membrane collecting station.

The curable composition application station may be located at an upstream position relative to the irradiation source and the irradiation source is located at a an upstream position relative to the composite membrane collecting station.

In this specification, compounds having one crosslinkable group are often referred to as monofunctional compounds, compounds having two crosslinkable groups are often referred to as difunctional compounds and compounds having three or more crosslinkable groups are often referred to as polyfunctional compounds.

The curable composition preferably comprises:
(i) 0 to 80 parts in total of monofunctional compounds;
(ii) 1 to 99 parts in total of difunctional compounds;
(iii) 0 to 50 parts in total of polyfunctional compounds;
(iv) 2 to 99 parts of an inert liquid;
wherein all parts are by weight and at least 60 wt % of non-volatile components in the composition are oxyethylene groups.

Photoinitiators and the non-solvent part of any surfactants are not usually volatile and therefore form part of the discriminating layer.

The monofunctional compound, i.e. component (i), is unable to crosslink because it has only one crosslinkable group. However it is able to react with other components present in the curable composition. The presence of at least some monofunctional compound is often desirable because monofunctional compounds can provide the resultant discriminating layer with a desirable degree of flexibility. Curable compositions containing only difunctional and polyfunctional compounds can sometimes be rather rigid and in some cases this can adversely affect the rate of gas flux through the resultant composite membrane. However too much monofunctional compound can lead to a discriminating layer with a very loose structure and poor selectivity. Also the efficiency of the curing can reduce when large amounts of monofunctional compounds are used, increasing the time taken to complete curing and potentially requiring inconvenient conditions therefore. Bearing these factors in mind, the number of parts of component (i) is preferably 0 to 40, more preferably 0 to 20 parts by weight.

The difunctional compound, i.e. component (ii), is usually the major or sometimes the only polymerisable component in the curable composition. Generally the difunctional component provides strength to the discriminating layer. It may also assist the discriminating layer in distinguishing between gases by the presence of chemical groups (e.g. oxyethylene groups) which have an affinity or aversion to certain gases. The number of parts of component (ii) is preferably 1 to 60, more preferably 2 to 40, especially 2 to 20 parts by weight.

The polyfunctional compounds (iii) can also provide strength to the discriminating layer. The presence of 3 or more crosslinkable groups also helps the formation of a three dimensional polymer network in the resultant discriminating layer. However too much polyfunctional compound may lead to a rigid structure and inflexibility of the discriminating layer may result. Bearing these factors in mind, the number of parts of component (iii) is preferably 0 to 30, more preferably 0 to 10.

The function of the inert liquid (iv), when present, is to provide the curable composition with a viscosity suitable for the particular method used to apply the curable composition to the porous support. For high speed application processes one will usually choose an inert liquid of low viscosity. The number of parts of component (iv) is preferably 50 to 99, more preferably 60 to 98, especially 70 to 97, more especially 75 to 95.

Typically the inert liquid used as component (iv) comprises water and optionally one or more organic solvents, especially water-miscible organic solvent(s). The weight ratio of water to organic solvent used in component (iv) depends to some extent on the type and relative amounts of components in the curable composition and is preferably from 1:1 to 40:1, more preferably 2:1 to 30:1, especially 3:1 to 20:1.

As examples of water-miscible organic solvents there may be mentioned: $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulphoxides, preferably dimethyl sulphoxide and sulpholane. Preferably the liquid medium comprises water and one or more, especially from 1 to 8, water-soluble organic solvents.

Component (iv) may contain other components, for example surfactants, viscosity enhancing agents, surface tension modifiers, biocides or other ingredients.

While this does not rule out the presence of other components in the composition (because it merely fixes the relative ratios of components (i), (ii), (iii) and (iv)), preferably the number of parts of (i)+(ii)+(iii)+(iv) add up to 100. When the number of parts of (i)+(ii)+(iii)+(iv) add up to 100 then the number of parts of (ii) are 1 to 98, preferably 2 to 60, more preferably 2 to 40, especially 2 to parts by weight.

Taking the above factors into account, the curable composition preferably comprises:
(i) 0 to 20 parts in total of monofunctional compounds;
(ii) 1 to 20 parts (preferably 2 to 20 parts) in total of difunctional compounds;
(iii) 0 to 5 parts in total of polyfunctional compounds;
(iv) 70 to 99 parts of an inert liquid;
(v) 0.01 to 5 parts of photoinitiator;
wherein all parts are by weight.

Preferably the number of parts of (i)+(ii)+(iii)+(iv)+(v) add up to 100.

Examples of suitable crosslinkable groups include ethylenically unsaturated groups, for example acrylate groups, methacrylate groups, acrylamide groups, vinyl ether groups, vinyl ester groups, vinyl amide groups, allyl ether groups, allyl ester groups, allyl amine groups, allyl amide groups, styryl groups, maleic groups, fumaric groups, glutaconic groups, itaconic groups, citraconic groups, mesaconic groups, tiglic groups, angelic groups, senecioic groups and epoxy groups, oxetane groups.

The preferred crosslinkable groups are (meth)acrylic ($CH_2$=CR—C(O)—) groups, especially (meth)acrylate ($CH_2$=CR—C(O)O—) groups, wherein R is H or $CH_3$.

Preferred ethylenically unsaturated groups in the crosslinkable group are not unsubstituted (i.e. wherein R is not H). Substituted ethylenically unsaturated groups are less reactive than non-substituted ethylenically unsaturated groups due to steric hindrance, which will result in slower cure. For high speed production methods fast cure is desired.

When a large part of the crosslinkable groups in the curable composition are substituted ethylenically unsaturated groups, curing preferably uses a high energy radiation source, for example electron beam irradiation or plasma treatment.

The curable composition preferably comprises a greater proportion of unsubstituted ethylenically unsaturated compounds than substituted ethylenically unsaturated compounds (or even no substituted ethylenically unsaturated compounds) because this can result in improvements in gas flux.

The preferred crosslinkable groups are acrylate groups because of their fast polymerisation rates, especially when using UV light to effect the polymerisation. Many compounds having acrylate groups are also easily available from commercial sources.

The network structure of the discriminating layer is determined to a large extent by the identity of crosslinkable compounds and their functionality, e.g. the number of crosslinkable groups they contain per molecule.

One approach for ensuring the resultant discriminating layer has the desired degree of flexibility without relying wholly (or even partly) on the inclusion of a monofunctional compound is to include within component (ii) (the difunctional compound(s)) a large difunctional compound and/or a difunctional compound where the functional (i.e. crosslinkable) groups are far apart. So, for example, as curable compound in component (ii), one may use a high molecular weight difunctional compound, e.g. a difunctional compound wherein the two crosslinkable groups are located on opposite the ends of a large, optionally linear molecule. In this way the desired flexibility is achieved in the discriminating layer without having to include a monofunctional compound, although a monofunctional compound may still be included if desired.

The high molecular weight difunctional compound suitable for providing the desired degree of flexibility in the discriminating layer typically has a molecular weight of at least 500 Da, more preferably at least 1000 Da, especially at least 1200 Da and more especially at least 1500 Da. Molecular weights as high as 20, or even 60 kDa or more may be used. Preferably the molecular weight of the high molecular weight difunctional compound is below 100 kDa.

The curable composition may also comprise polymers comprising two or more reactive groups, e.g. (meth)acrylated polyesters, (meth)acrylated polyamides, (meth)acrylated polyurethanes, (meth)acrylated polyacrylates, epoxylated polyesters, epoxylated polyurethanes, epoxylated polyacrylates, etc.

Such polymers preferably have a molecular weight of less than 10000 kDa. For the separation of polar gases and vapours (e.g. $CO_2$, $H_2S$, $H_2O$, $SO_2$, etc.) the curable composition preferably has a high oxyethylene content, as described in more detail below.

To achieve a high oxyethylene content one may use mono-, di- and/or polyfunctional compounds (especially difunctional compounds) in the curable composition which are rich in oxyethylene groups, e.g. those which comprise at least 10 oxyethylene groups, more preferably at least 15, especially at least 25 or even 35, oxyethylene groups.

There is no specific limit to the maximum number of oxyethylene groups in the curable compounds used in the curable composition, but crystallization of the poly-oxyethylene chain under the conditions the composite membrane is used should be prevented as much as possible, because in crystallized form the gas flux rate through the composite membrane can be severely reduced.

In high temperature uses (e.g. separation of flue gas or water vapour) discriminating layers with matrices crystallizing at or below room temperature can be used without negative effects on the flux because the operating temperature of the membrane is higher than the crystallization temperature of the poly-oxyethylene chains in the discriminating layer.

The likelihood of undesirable crystallisation in discriminating layers derived from curable compounds containing a large amount of oxyethylene groups can be reduced by including one or more curable compounds which are free from oxyethylene groups in the curable composition.

The presence in the curable composition of curable compounds which are free from oxyethylene groups will of course lower the oxyethylene content of the discriminating layer and if the content is too low this can adversely affect the ability of the discriminating layer to separate polar and non-polar gases. If the intention is not to separate polar and non-polar gases than there is no problem, however if polar/non-polar gas separation is the objective then a balance needs to be struck between the desire for flexibility in the membrane and the desire for a high degree of selectivity between polar and non-polar gases.

Preferably oxyethylene groups constitute at least 70 wt % of the total weight of non-volatile components (usually components (i), (ii), (iii) and (v)) in the curable composition, although component (iv) may also comprise compounds rich in oxyethylene groups. The preferred upper limit is 96 wt % of the total weight of non-volatile components.

The presence in the curable composition of curable compounds which are free from oxyethylene groups can be particularly useful in fields such as air separation and hydrocarbon separation, e.g. a crosslinkable silicone polymers such as divinyl-polydimethylsiloxane can prove useful as components for the curable composition.

The oxyethylene groups which may be present in the crosslinkable compounds or the monofunctional compounds optionally comprises an uninterrupted or an interrupted chain. A preferred uninterrupted chain of oxyethylene groups is of formula —$(CH_2CH_2O)_n$— wherein n is 5 to 500. A preferred interrupted chain of oxyethylene groups is of the formula —$(CH_2CH_2O)_{n-q}$R—$(OCH_2CH_2)_q$—, wherein q is 1 to n−1, n is 5 to 500 and R is —$CH_2$—, —$(CH_2)_x$— wherein x is >2 (e.g. x is 3 to 6), —$CH(CH_3)$—, —$C(CH_3)_2$—, —$CH_2$—$C(CH_3)_2$—$CH_2$—, —$C_6H_4$—, —$C_6H_4$—$C(CH_3)_2$—$C_6H_4$— (bisphenol A) or —(C=O)—.

The wt % oxyethylene groups in the curable composition may be calculated as illustrated in the Examples.

Examples of suitable monofunctional compounds include 2-hydroxyethyl acrylate, 2-hydroxyethyl methacrylate, polyethylene glycol monoacrylate, polyethylene glycol monomethacrylate, hydroxypropyl acrylate, hydroxypropyl methacrylate, polypropylene glycol monoacrylate, polypropylene glycol monomethacrylate, 2-methoxyethyl acrylate, 2-phenoxyethyl acrylate, 2-phenoxyethyl methacrylate and combinations thereof.

Further examples of monofunctional compounds are of the following structure, wherein w is 1 to 100 and $R^{11}$ is H or an alkyl group of $C_1$-$C_{10}$ or an aromatic group or an alkoxy group or an ester group, and $R^{12}$ is H or a methyl group.

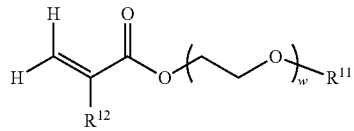

Examples of suitable difunctional compounds include poly (ethylene glycol) diacrylate, poly(ethylene glycol)divinyl ether, poly(ethylene glycol)diallyl ether, Bisphenol A ethoxylate diacrylate, neopentyl glycol ethoxylate diacrylate, propanediol ethoxylate diacrylate, butanediol ethoxylate diacrylate, hexanediol ethoxylate diacrylate, poly(ethylene glycol-co-propylene glycol)diacrylate, poly(ethylene glycol)-block-poly(propylene glycol)-block-poly(ethylene glycol) diacrylate, a diacrylate of a copolymer of polyethylene glycol and other building blocks e.g. polyamide, polycarbonate, polyester, polyimid, polysulfone, and combinations thereof.

Examples of suitable polyfunctional compounds include glycerol ethoxylate triacrylate, trimethylolpropane ethoxylate triacrylate, trimethylolpropane ethoxylate triacrylate, pentaerythrytol ethoxylate tetraacrylate, ditrimethylolpropane ethoxylate tetraacrylate, dipentaerythrytol ethoxylate hexaacrylate and combinations thereof.

The composition may be cured by any suitable means. Preferably the composition is a radiation curable composition and the curing is caused by irradiation. In this embodiment the irradiation may be by any source which provides the wavelength and intensity of radiation necessary to cause the composition to polymerise. For example, electron beam, UV, visible and infra red radiation may be used to cure the composition, the appropriate radiation being selected to match the composition. For UV curing a mercury arc lamp is particularly effective, but light emitting diodes can also be used.

Preferably curing of the composition begins within 7 seconds, more preferably within 5 seconds, most preferably within 3 seconds, of the composition being applied to the porous support layer.

Preferably the composition is a radiation curable composition and the curing is achieved by irradiating the composition for less than 30 seconds, more preferably less than 10 seconds, e.g. less than 5 seconds. This gives rise to a radiation cured discriminating layer.

The terms curing and polymerization are used interchangeably throughout this document.

Curing by infrared radiation is also known as thermal curing. Thus curing uses infrared radiation and the composition preferably comprises monomers having ethylenically unsaturated groups and one or more thermally reactive free radical initiators, the latter typically being present in an amount of 0.01 to 5 parts per 100 parts of curable components in the curable composition, wherein all parts are by weight.

Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α-azobisisobutyronitrile and/or γ,γ'-azobis(γ-cyanovaleric acid); persulfates; peracetates, e.g. methyl peracetate and/or tert-butyl peracetate; peroxalates, e.g. dimethyl peroxalate and/or di(tert-butyl)peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably the curing uses ultraviolet light. Suitable wavelengths are for instance UV-A (400 to >320 nm), UV-B (320 to >280 nm), UV-C (280 to 200 nm), provided the wavelength matches with the absorbing wavelength of any photo-initiator included in the composition.

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the discriminating layer. Preferably the exposure dose is at least 40 mJ/cm$^2$, more preferably between 40 and 600 mJ/cm$^2$, most preferably between 70 and 220 mJ/cm$^2$ as measured by an High Energy UV Radiometer (UV Power Puck™ from EIT-Instrument Markets) in the UV-B range indicated by the apparatus. Exposure times can be chosen freely but preferably are short and are typically less than 2 seconds.

To reach the desired dose at high coating speeds more than one UV lamp may be required, so that the curable composition is exposed to more than one lamp. When two or more lamps are applied all lamps may give an equal dose or each lamp may have an individual setting. For instance the first lamp may give a higher dose than the second and following lamps or the exposure intensity of the first lamp may be lower.

Photo-initiators may be included in the curable composition and are usually required when curing uses UV or visible light radiation. Suitable photo-initiators are those known in the art such as radical type, cation type or anion type photo-initiators.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto:

For acrylates, diacrylates, and polyacrylates, type I photo-initiators are preferred. Especially alpha-hydroxyalkylphenones, such as 2-hydroxy-2-methyl-1-phenyl propan-1-one, 2-hydroxy-2-methyl-1-(4-tert-butyl-) phenylpropan-1-one, 2-hydroxy-[4-(2-hydroxypropoxy)phenyl]-2-methylpropan-1-one, 2-hydroxy-1-[4-(2-hydroxyethoxy)phenyl]-2-methyl propan-1-one, 1-hydroxycyclohexylphenylketone and oligo [2-hydroxy-2-methyl-1-{4-(1-methylvinyl) phenyl}propanone], alpha-aminoalkylphenones, alpha-sulfonylalkylphenones and acylphosphine oxides such as 2,4,6- trimethylbenzoyl-diphenylphosphine oxide, ethyl-2,4,6-trimethylbenzoylphenylphosphinate and bis(2,4,6-trimethylbenzoyl)-phenylphosphine oxide, are preferred.

Preferably the ratio of photo-initiator to components (i)+(ii)+(iii) is between 0.0001 and 0.2 to 1, more preferably between 0.001 and 0.1 to 1, based on weight.

It is preferred to minimize the amount of photo-initiator used, in other words preferably all photo-initiator has reacted after the curing step(s). A single type of photo-initiator may be used but also a combination of several different types. Cationic photo-initiators are very suitable when any of the compounds have epoxy, oxetane or other ring opening heterocyclic groups or vinyl ether groups. Preferred cationic photo-initiators are organic salts of non-nucleophilic anions such as hexafluoroarsinate ion, antimony(V) hexafluoride-ion, phosphorus hexafluoride-ion and tetrafluoroborate ion. Commercially available examples include UVI-6974, UVI-6970, UVI-6990 (manufactured by Union Carbide Corp.), CD-1010, CD-1011, CD-1012 (manufactured by Sartomer Corp.), Adekaoptomer SP-150, SP-151, SP-170, SP-171 (manufactured by Asahi Denka Kogyo Co., Ltd.), Irgacure™250 and Irgacure™261 (Ciba Specialty Chemicals Corp.), CI-2481, CI-2624, CI-2639, CI-2064 (Nippon Soda Co., Ltd.), DTS-102, DTS-103, NAT-103, NDS-103, TPS-103, MDS-103, MPI-103 and BBI-103 (Midori Chemical Co., Ltd.). The above mentioned cationic photo-initiators can be used either individually or in combination of two or more. The most preferred cationic photoinitiator is a triarylsulfonium hexafluoroantemonate, e.g. UVI-6974 (from Union Carbide).

When UV radiation is used for curing a UV light source can be selected having emissions at several wavelengths. The combination of UV light source and photo-initiator(s) can be optimized so that sufficient radiation penetrates deep into the discriminating layer(s) to activate the photo-initiators. A typical example is an H-bulb with an output of 600 Watts/inch (240 W/cm) as supplied by Fusion UV Systems which has emission maxima around 220 nm, 255 nm, 300 nm, 310 nm, 365 nm, 405 nm, 435 nm, 550 nm and 580 nm. Alternatives are the V-bulb and the D-bulb which have a different emission spectrum. Preferably the UV light source and the photo-initiators are chosen such that the wavelength of the UV light provided corresponds to the absorption of the photo initiator(s). From a choice of light sources and photo-initiators optimal combinations can be made. Applying multiple types of photo-initiator allows for thicker layers to be cured efficiently with the same intensity of irradiation.

When no photo-initiator is included in the curable composition, the composition can be advantageously cured by electron-beam exposure, e.g. using an exposure of 50 to 300 keV. Curing can also be achieved by plasma or corona exposure.

Curing rates may be increased by including amine synergists in the curable composition. Amine synergists are known to enhance reactivity and retard oxygen inhibition. Suitable amine synergists are e.g. free alkyl amines such as triethylamine, methyldiethanol amine, triethanol amine; aromatic amine such as 2-ethylhexyl-4-dimethylaminobenzoate, ethyl-4-dimethylaminobenzoate and also polymeric amines as polyallylamine and its derivatives. Curable amine synergists such as ethylenically unsaturated amines (e.g. (meth) acrylated amines) are preferable since their use will give less odour due to its ability to be incorporated into the discriminating layer by curing. The amount of amine synergists is preferably from 0.1-10 wt % based on the weight of polymerizable compounds in the composition, more preferably from 0.3-3 wt %.

Where desired, a surfactant or combination of surfactants may be included in the composition as a wetting agent or to adjust surface tension. Commercially available surfactants may be utilized, including radiation-curable surfactants. Surfactants suitable for use in the composition include non-ionic surfactants, ionic surfactants, amphoteric surfactants and combinations thereof.

Preferred surfactants are as described in WO 2007/018425, page 20, line to page 22, line 6, which are incorporated herein by reference thereto. Fluorosurfactants are particularly preferred, especially Zonyl® FSN (produced by E.I. Du Pont).

The permeability to gases is influenced by the swellability of the discriminating layer and by plasticization. By plasticization compounds penetrate the membrane and act as plasticizer. In humid environments water (vapour) may cause the swelling but also impurities in the gas flow such as hydrocarbon compounds, alcohols, etc. may contribute. Too much swelling/plasticization may reduce the selectivity for polar gases over non-polar gases and may damage the membrane. The degree of swelling can be controlled by the types and ratio of crosslinkable compounds, the extent of crosslinking (exposure dose, photo-initiator type and amount) and by other ingredients (e.g. chain transfer agents, synergists). In one embodiment at least two compositions are coated (simultaneously or consecutively) onto the porous support layer. Thus coating may be performed more than once, either with or without curing being performed between each coating step. As a consequence a composite membrane is formed comprising at least one top layer and at least one bottom layer that is closer to the porous support than the top layer. In this embodiment the top layer and bottom layer, together with any intervening layers, constitute the discriminating layer and the porous support provides strength to the composite membrane.

The composition may optionally contain polymerizable compounds having one or more functional thiol groups. These compounds may act as chain transfer agents which are known to be less sensitive to oxygen inhibition and whose usage result in a relatively uniform polymer chain length and crosslink density. Examples of thiol compounds include mercaptoacetic acid, mercaptopropionic acid, alkyl mercaptopropionate, mercapto-propylsulfonate, ethyldithiocarbonato-S-sulfopropylester, dimercaptopropane sulfonate mercaptobenzimidazole sulfonate. Preferred thiol compounds are mercaptoethanol, mercaptoethylether, mercaptobenzimidazole, ethyldithioacetate, butanethiol, and ethylenedioxydiethanethiol. Optimum quantities depend very much on the ingredients used in the composition, on the type of the chain transfer agent (reactivity) and on the irradiation dose. Therefore the optimum concentration is determined routinely on a case-by-case basis. At high levels of chain transfer agents it was found that adhesion problems may occur. When a multilayer discriminating layer is made the chain transfer agent is preferably in the top layer where the effect on surface structure is expected to be the highest. Very high levels may retard the crosslinking reaction too much resulting in a discriminating layer that is not completely polymerized and is still wet. Preferably the chain transfer agent is present in an amount between 0.001 and 1.0 mmol/g of polymerizable components. For most compounds the preferred range will be between 0.005 and 0.1 mmol/g polymerizable components. If the discriminating layer consists of more than one layer the mentioned range apply to the layer or layers comprising the chain transfer agent.

Other additives which may be included in the composition are plasticizers, such as (poly)alkylene glycol, glycerol ethers and polymer lattices with low Tg-value and the like and one or more conventional additives, such as acids, pH controllers, preservatives, viscosity enhancing agents, stabilisers, dispersing agents, inhibitors, antifoam agents, organic/inorganic salts, anionic, cationic, non-ionic and/or amphoteric surfactants and the like in accordance with the objects to be achieved.

Examples of viscosity enhancing agents include: poly (meth)acrylic acid in free acid or salt form; poly alkylene oxides, e.g. poly(ethylene oxide) and poly(propylene oxide); polyvinyl alcohol; polyvinyl pyrrolidone; poly alkyl(meth) acrylate; polystyrene; polyolefins; polyesters; polyethers; polyamides, and copolymers of the foregoing. The preferred molecular weight (MW) of the viscosity enhancement agents is 10 kD to 20000 kD, preferably 100 kD to 10000 kD, e.g. about 1000 kD or about 8000 kD. The preferred concentration for the viscosity enhancement agents is 0.01 wt % to 10 wt %, more preferably 0.02 wt % to 5 wt %, especially 0.03 wt % to 2 wt %, relatively to the total weight of the other components in the composition.

In another embodiment the curable composition is free from viscosity enhancing agents (e.g. free from binders and high molecular weight cross-linkable compounds). In this embodiment the viscosities of both the inert liquid and the curable composition are low and preferably the process is performed such that steps are taken to ensure there is no or little turbulence when the various liquids are applied to the support.

The above-mentioned additives (photo-initiators, amine synergists, surfactants, chain transfer agents, plasticizers, conventional additives) may be selected from those known to a person skilled in the art and may be included in the composition in a range of preferably from 0 to 20 wt % based on the composition and its desired properties as long as the content of oxyethylene groups in the discriminating layer is at least 60 wt %. Any of the components mentioned above may be employed alone or in combination with each other. They may be added after being solubilised in water, dispersed, polymer-dispersed, emulsified or may be converted into oil droplets.

The process of the present invention may contain further steps if desired, for example washing and/or drying the composite membrane and removing the inert solvent from the porous layer, e.g. by evaporation.

When high intensity UV light is used for curing a considerable amount, of heat may be generated. To prevent overheating one may therefore apply cooling air to the lamps and/or the porous support/composite membrane. Still a significant dose of IR light is irradiated together with the UV-beam. In one embodiment curing is performed by irradiation using. UV light filtered through an IR reflecting quartz plate.

A further aspect of the present invention provides a gas separation module for separating a feed gas containing a target gas into a gas stream rich in the target gas and a gas stream depleted in the target gas, the module comprises a housing and one or more cartridges comprising a composite membrane according to the present invention.

A still further aspect of the present invention provides a gas separation cartridge comprising a composite membrane according to the present invention.

The composite membrane (which may also be referred to as a gas separation element) is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

Preferred gas separation modules comprise a composite membrane spiral-wound membrane according to the present invention in the form of a spiral-wound cartridge. Such spiral-wound cartridges preferably further comprise spacers and outer impermeable support layers, the spacers being positioned on each side of the composite membrane and between the membrane and the impermeable support layer and thereby defining a feed channel on one side of the membrane and a permeate channel on the other side of the membrane, wherein the membrane, spacers and outer impermeable layers are wound in a spiral manner around a core.

The spacers are typically, but not necessarily, made from plastic mesh or netting, which helps to promote turbulent flow in the gas channels. In manufacturing spiral-wound cartridges, care is taken in the choice of spacers. An overly tight mesh may result in pressure drops along the feed or permeate channel that adversely affect separation performance when the cartridge is in use. Likewise, a tight spacer may facilitate the formation of stagnant boundary layers that give rise to concentration polarisation adjacent to the composite membrane surface. Similar issues affect the manufacture of plate-and-frame cartridges.

In spiral-wound cartridges incorporating mesh spacers, the spacers are preferably sufficiently strong to support the composite membrane and hold open the feed and permeate channels, and sufficiently open to limit pressure drops along the channels and concentration polarisation problems.

More details on the manufacture of spiral-wound cartridges can be found in U.S. Pat. No. 3,417,870, U.S. Pat. No. 4,746,430 and U.S. Pat. No. 5,096,584.

When the cartridge is to be used to carry out gas separation using a sweep gas on the permeate side, then the cartridge preferably also includes an inlet to the permeate side of the composite membrane by which the sweep gas can be passed into the cartridge.

Hollow fibre cartridges do not normally require spacers, because the composite membranes may be held in a spaced-apart relationship by a potting compound.

Referring now to the hollow-fibre type gas separation cartridge, the gas separation cartridge preferably comprises:
  (a) a tubular gas separation element comprising a wall of composite membrane and one or more gas outlets;
  (b) a housing accommodating the gas separation element, the housing comprising an external wall and one or more gas outlets;
  (c) a void between the element wall and the housing external wall;
  (d) one or more inlets for introducing feed gas into either the tubular gas separation element or into the void;
wherein:
  (i) the composite membrane is as defined in the first aspect of the present invention; and
  (ii) the cartridge is constructed such that essentially the only way for the target gas to travel between the inside of the tubular gas separation element and the void is through the wall of the composite membrane.

In this preferred hollow-fibre type gas separation cartridge, the feed gas containing the target gas may be introduced into either the tubular gas separation element or into the housing void.

Thus in a first embodiment the feed gas containing the target gas is introduced into a near end of the tubular gas separation element through the one or more inlets. The feed gas then passes longitudinally within the tube, with the target gas permeating through the selective composite membrane more easily than other gases within the feed gas. A gas stream depleted in target gas may then exit the cartridge through an outlet at the far end of the tubular gas separation element. A gas stream rich in target gas may then exit the cartridge through an outlet at the far end of the housing.

In a second embodiment the feed gas containing the target gas is introduced into a near end of the housing through the one or more inlets. The feed gas then passes longitudinally within the housing, with the target gas permeating through the selective composite membrane more easily than other gases within the feed gas. A gas stream depleted in target gas may then exit the cartridge through an outlet at the far end of the housing. A gas stream rich in target gas may then exit the cartridge through an outlet at the far end of the tubular gas separation element.

Preferably at least 95%, more preferably all of the target gas which travels between the inside of the tubular gas separation element and the void (whatever the direction of flow) does so through the wall of the composite membrane.

The preferred cartridge geometries therefore include plate-and-frame, spiral-wound, hollow-fibre, tubular and envelope type. More information on cartridge geometries can be found in "Membrane Technology in the Chemical Industry", edited by S. P. Nunes and K.-V. Peinemann, page 76-78 and page 101-103 and in "Membrane Technology and Applications" (second edition), edited by R. Baker, page 139-155.

While this specification emphasises the usefulness of the composite membranes of the present invention for separating gases, especially polar and non-polar gases, it will be understood that the composite membranes can also be used for other purposes, for example providing a reducing gas for the direct reduction of iron ore in the steel production industry, dehydration of organic solvents (e.g. ethanol dehydration), pervaporation and vapour separation.

The composite membrane of the invention may be used in conjunction with other membranes or with other gas separation techniques if desired, e.g. with solvent absorption (e.g. Selexol, Rectisol, Sulfinol, Benfield), amine absorption (e.g. DEA, MDEA), physical adsorption, e.g. pressure swing adsorption, cryogenic techniques, etc. The composite membranes are particularly suitable for separating a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, $N_2$, and water vapour.

The target gas may be, for example, a gas which has value to the user of the composite membrane and which the user wishes to collect. Alternatively the target gas may be an undesirable gas, e.g. a pollutant or 'greenhouse gas', which the user wishes to separate from a gas stream in order to protect the environment. The composite membranes are particularly useful for purifying natural gas (a mixture which predominantly comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha CO_2/CH_4$)>10. Preferably the selectivity is determined by a process comprising exposing the membrane to a 50:50 mixture by volume of $CO_2$ and $CH_4$ at a feed pressure of 2000 kPa.

Preferably the composite membrane has a $CO_2/N_2$ selectivity ($\alpha CO_2/N_2$)>35, more especially greater than 40. Preferably the selectivity is determined by a process comprising exposing the membrane to $CO_2$ and $N_2$ separately at feed pressures of 2000 kPa.

The invention is now illustrated by the following non-limiting examples in which all parts and percentages are by weight unless otherwise specified. ("Comp." means Comparative Example).

Examples 1 to 6 and Comparative Examples 1 to 2

The following examples are prepared by applying a curable composition to a porous support layer as described below.

(a) Porous Support Layers

The porous support layers used in these examples are abbreviated as follows:

| Abbreviation | Description |
| --- | --- |
| GMT-L-6 and GMT-NC-5 | Ultrafiltration polyacrylonitrile membranes from GMT Membrantechnik GmbH, Germany. |
| Versapor | A microfiltration acryl copolymer membrane from Pall. |
| Supor200 | A microfiltration polyethersulfone membrane from Pall. |
| PAN200 | An ultrafiltration polyacrylonitrile membrane from Sepro. |
| GR70PP | An ultrafiltration polysulfone membrane from Alfa Laval. |

(b) Curable Compositions

The following abbreviations are used when referring to the curable compositions (EO is an abbreviation for oxyethylene):

| Abbreviation | Description | MWT (total) | EO MWT | % EO |
| --- | --- | --- | --- | --- |
| PEG600DA | Poly(ethylene glycol) diacrylate from Aldrich | 700 | 574 | 82.0 |
| CD9038 | Ethoxylated (30) bisphenol A diacrylate from Sartomer. | 1660 | 1320 | 79.5% |

-continued

| Abbreviation | Description | MWT (total) | EO MWT | % EO |
|---|---|---|---|---|
| CD553 | Methoxy poly(ethylene glycol) (550) mono acrylate from Sartomer | 636 | 528 | 83.0% |
| AQTWB | Aquacalk ™ TWB - crosslinked poly(oxyalkylene), from Sumitomo | | | 95%* |
| Additol ™ HDMAP | A photo-initiator from Cytec Surface Specialties | | | 0% |
| Zonyl ™ FSN-100 | A water-soluble ethoxylated nonionic fluoro surfactant from DuPont | | | ~60%* |

*estimated value

The curable compositions used in the Examples were as described in Table 1 below:

TABLE 1

| Component | % EO | Curable Composition A | Curable Composition B | Curable Composition C | Curable Composition D |
|---|---|---|---|---|---|
| PEG600DA | 82.0 | 8.5 | 0 | 0 | 0 |
| CD9038 | 79.5 | 0 | 10 | 8 | 2 |
| CD553 | 83.0 | 0 | 0 | 0 | 6 |
| Aquacalk TWB | 95 | 1.5 | 0 | 2 | 2 |
| Additol HDMAP | 0 | 0.1 | 0.5 | 0.5 | 1 |
| Isopropanol | N/A | 4.5 | 6 | 6 | 6 |
| Zonyl ™ FSN-100 | 60 | 0.3 | 0.3 | 0.3 | 0.3 |
| Water | N/A | 85.9 | 83.2 | 83.2 | 82.7 |
| Viscosity at 35° C. (mPa · s) | | 19.1 | 1.67 | 20.2 | 36.5 |
| Overall wt % oxyethylene | | 82.5% | 75.3% | 78.1% | 76.5% |

All amounts are expressed in wt %.
The wt % oxyethylene in Curable Composition A the EO content was {(8.5 × [0.82]) + (1.5 × 0.95) + (0.1 × 0) + (0.3 × 0.6)}/10.4 × 100% = 82.5%.
In Curable Composition B the wt % oxyethylene was {(10 × 0.795) + (0.5 × 0) + (0.3 × 0.6)}/10.8 × 100% = 75.3%.
In Curable Composition C the wt % oxyethylene was {(8 × 0.795) + (2 × 0.95) + (0.5 × 0) + (0.3 × 0.6)}/10.8 × 100% = 78.1%.
In Curable Composition D the wt % oxyethylene was {(2 × 0.795) + (6 × 0.83) + (2 × 0.95) + (1 × 0) + (0.3 × 0.6)}/11.3 × 100% = 76.5%.

Example 1

A length of porous support layer (GM-L-6) was spliced into a roll of laminated paper as guide that was fed as a web through a composite membrane manufacturing unit. The web moved at a speed of 30 m/min. Curable Composition A at 40° C. was applied continuously to the moving porous support layer by means of composition application station comprising a slide bead coating machine using just one of its slots. The coated support passed under an irradiation source (a Light Hammer LH6 from Fusion UV Systems fitted with a D-bulb working at 100% intensity) and then to a drying zone at 40° C. and 8% relative humidity. The dried, composite membrane then travelled to the collecting station.

A section through the resultant composite membrane was examined by a scanning electron microscope (SEM) and the discriminating layer was found to have a thickness of 1.5 μm.

Example 2

The method of Example 1 was repeated except that two slots of the slide bead coating machine were used: One slot applied a 100 μm thickness lower layer of inert liquid (water) to the porous support, thereby filling the pores with inert liquid, and the other slot applied a 15 μm thickness layer of Curable Composition C to the wet porous support. The resultant discriminating layer was found to have a thickness of 0.925 μm.

Examples 3 to 6 and Comparative Examples 1 and 2

Example 2 was repeated except that the porous support layer described in the Table 2, column 2 was used and the wet thickness of the layer of Curable Composition C was as shown in column 3. The dry thickness of the resultant discriminating layer is shown in column 4:

TABLE 2

| Example | Porous Support Layer | Curable Composition (thickness in μm) | Discriminating Layer Thickness (μm) |
|---|---|---|---|
| 3 | GMT-L-6 | C (6) | 0.20 |
| 4 | GMT-L-6 | C (4) | 0.25 |
| 5 | GMT-NC-5 | C (15) | 0.8 |
| 6 | PAN200 | C (15) | 0.8 |
| Comp. 1 | Versapor | C (15) | None formed |
| Comp. 2 | GR70PP | C (15) | 0.9 |

Notes to Table 2:
Versapor has a $CO_2$ gas flux of $154 \times 10^{-5}$ m³(STP)/m² · s · kPa.
GR70PP has a $CO_2$ gas flux of $<1.5 \times 10^{-5}$ m³(STP)/m² · s · kPa.

Examples 7 to 18

Examples 1 to 6 may be repeated except that in place of Curable Composition A or C there is used Curable Composition B or D.

Tests and Results

The support layers and the composite membranes prepared in the Examples 1 to 6 and Comparative Examples 1 and 2 were tested as follows.

(A1) Measuring the $CO_2$ Gas Flux of the Porous Support Layers

Samples of the porous support layers under examination were set into a Millipore membrane cell with an area of 13.8 cm². $CO_2$ gas at room temperature at a feed pressure of 2.07 kPa was applied to one side of the porous support material and the flow rate of gas permeating through the other side of the membrane ($Js_{CO2}$) was measured using a digital flow meter. The $CO_2$ gas flux of the support ($Qs_{CO2}$) in m³ (STP)/m²·s·kPa at a feed pressure of 2.07 kPa was then determined by the following calculation:

$$Qs_{CO2} = Js_{CO2}/(A \times p)$$

wherein:
$Js_{CO2}$ is the flow rate of $CO_2$ in m³/s;
A is the membrane area in m²; and
p is the feed pressure in kPa.

(A2) Method for Determining the $CO_2/N_2$ Selectivity

The $CO_2$ gas flux ($Q_{CO2}$) and $N_2$ gas flux ($Q_{N2}$) of the composite membranes were determined separately using an analogous method to that described in (A1) above but at a feed pressure of 2000 kPa.

The selectivity ($\alpha CO_2/N_2$) was then determined by the following calculation:

$$\alpha CO_2/N_2 = Q_{CO2}/Q_{N2}$$

(A3) Method for Determining the $CO_2/CH_4$ Selectivity

The general method (A1) was followed except that the feed gas was a 50:50 mixture by volume of $CO_2$ and $CH_4$ and the feed pressure was 2000 kPa. The gas permeating through the composite membrane was analyzed by gas chromatography to determine the ratio of $CO_2/CH_4$.

The selectivity ($\alpha CO_2/CH_4$) was then determined by the following calculation:

$$\alpha CO_2/CH_4 = (I_{pCO2} \times I_{fCH4})/(I_{pCH4} \times I_{fCO2})$$

wherein:

$I_{pCO2}$ is the area of the $CO_2$ peak from the permeate gas;
$I_{pCH4}$ is the area of the $CH_4$ peak from the permeate gas;
$I_{fCO2}$ is the area of the $CO_2$ peak from the feed gas; and
$I_{fH4}$ is the area of the $CH_4$ peak from the feed gas.

The test results are shown in Table 3 and 4 below:

TABLE 3

| Ex. | Porous Support Layer | $CO_2$ gas flux of porous support layer QsCO2 ($\times 10^{-5}$ m³/m²·s·kPa) | Oxyethylene groups (wt %) | Discriminating layer thickness (μm) | $CO_2$ gas flux of composite membrane $Q_{CO2}$ ($\times 10^{-6}$ m³/m²·s·kPa) | $CO_2/N_2$ selectivity |
|---|---|---|---|---|---|---|
| 1 | GMT-L-6 | 34.5 | 82.5 | 1.5 | 0.32 | 63 |
| 2 | GMT-L-6 | 34.5 | 78.1 | 0.925 | 0.45 | 62 |
| 3 | GMT-L-6 | 34.5 | 78.1 | 0.20 | 1.02 | 51 |
| 4 | GMT-L-6 GMT-NC-5 | 34.5 | 78.1 78.1 | 0.25 | 1.29 | 49 |
| 5 | | 15.8 | | 0.8 | 0.34 | 71 |
| C1 | Versapor | 154.0 | 78.1 | <0.1 | >3.0 | <2.0 |
| C2 | GR70PP | <1.5 | 78.1 | 0.9 | 0.003 | 71 |

From Table 3 it can be seen that Comparative Example 1 where the composite membrane comprises a porous support having a gas flux of $154 \times 10^{-5}$ m³ (STP)/m²·s·kPa at a feed pressure of 2.07 kPa had poor $CO_2/N_2$ selectivity. Comparative Example 2 where the composite membrane comprises a porous support having a $CO_2$ gas flux of $<1.5 \times 10^{-5}$ m³ (STP)/m²·s·kPa at a feed pressure of 2.07 kPa suffered from a very poor flux rate. However the composite membranes according to the invention had a good flux rate without compromising $CO_2/N_2$ selectivity.

For a selection of the Examples the mixed $CO_2/CH_4$ gas selectivity was determined using a mixed gas technique.

TABLE 4

| Example | Porous Support Layer | Mixed $CO_2/CH_4$ selectivity |
|---|---|---|
| 2 | GMT-L-6 | 14.5 |
| 3 | GMT-L-6 | 10.5 |
| 4 | GMT-L-6 | 12.5 |
| 5 | GMT-NC-5 | 14.3 |
| C1 | Versapor | 1.2 |

The invention claimed is:

1. A composite membrane comprising a discriminating layer and a porous support layer for the discriminating layer, CHARACTERISED IN THAT the discriminating layer comprises at least 60 wt % of oxyethylene groups and the porous support layer has a $CO_2$ gas flux of 5 to $150 \times 10^{-5}$ m³ (STP)/m²·s·kPa at a feed pressure of 2.07 kPa.

2. A membrane according to claim 1 wherein the porous support layer has a $CO_2$ gas flux of 7 to $100 \times 10$-5 m³ (STP)/m2·s·kPa at a feed pressure of 2.07 kPa.

3. A membrane according to claim 1 wherein the discriminating layer comprises at least 70 wt % of oxyethylene groups.

4. A membrane according to claim 1 wherein the thickness of the discriminating layer is 0.1 to 1 μm.

5. A membrane according to claim 1 wherein the discriminating layer is derived from a radiation curable composition.

6. A membrane according to claim 1 wherein the porous support layer has a $CO_2$ gas flux of 7 to $100 \times 10$-5 m3 (STP)/m2·s·kPa at a feed pressure of 2.07 kPa, the discriminating layer comprises at least 70 wt % of oxyethylene groups, the thickness of the discriminating layer is 0.1 to 1 μm and the discriminating layer is derived from a radiation curable composition.

7. A membrane according to claim 5 wherein the curable composition comprises:
(i) 0 to 80 parts in total of monofunctional compounds;
(ii) 1 to 99 parts in total of difunctional compounds;
(iii) 0 to 50 parts in total of polyfunctional compounds;
(iv) 2 to 99 parts of an inert liquid;
wherein all parts are by weight and at least 60 wt % of non-volatile components in the composition are oxyethylene groups.

8. A membrane according to claim 5 wherein the curable composition comprises:
(i) 0 to 20 parts in total of monofunctional compounds;
(ii) 1 to 20 parts in total of difunctional compounds;
(iii) 0 to 5 parts in total of polyfunctional compounds;
(iv) 70 to 99 parts of an inert liquid;
(v) 0.01 to 5 parts of photoinitiator;
wherein all parts are by weight.

9. A membrane according to claim 6 wherein oxyethylene groups constitute at most 96 wt % of the total weight of non-volatile components in the curable composition.

10. A membrane according to claim 6 wherein the curable composition comprises:
(i) 0 to 20 parts in total of monofunctional compounds;
(ii) 1 to 20 parts in total of difunctional compounds;
(iii) 0 to 5 parts in total of polyfunctional compounds;
(iv) 70 to 99 parts of an inert liquid;
(v) 0.01 to 5 parts of photoinitiator;
wherein all parts are by weight.

11. A gas separation cartridge comprising a membrane according to claim 1.

12. A gas separation cartridge comprising a membrane according to claim 6.

13. A gas separation cartridge comprising a membrane according to claim 10.

14. A gas separation cartridge according to claim 11 wherein the cartridge is in spiral-wound, plate-and-frame or envelope form.

15. A gas separation cartridge according to claim 12 wherein the cartridge is in spiral-wound, plate-and-frame or envelope form.

16. A gas separation cartridge according to claim 13 wherein the cartridge is in spiral-wound, plate-and-frame or envelope form.

17. A process for preparing a composite membrane comprising applying a curable composition to a porous support layer having a $CO_2$ gas flux of 5 to $150 \times 10^{-5}$ m$^3$ (STP)/m$^2$·s·kPa, when measured at a feed pressure of 2.07 kPa, and curing the composition, thereby forming a discriminating layer on the porous support layer, wherein the curable composition comprises non-volatile and optionally volatile components and at least 60 wt % of the non-volatile components are oxyethylene groups.

18. A process according to claim 17 wherein the curable composition is applied continuously to the porous support layer by means of a manufacturing unit comprising a curable composition application station, an irradiation source, a composite membrane collecting station and a means for moving a porous support layer from the curable composition application station to the irradiation source and to the composite membrane collecting station.

19. A process according to claim 17 wherein the composition is a radiation curable composition and the curing is achieved by irradiating the composition for less than 30 seconds.

20. A process according to claim 18 wherein the composition is a radiation curable composition and the curing is achieved by irradiating the composition for less than 30 seconds.

* * * * *